United States Patent [19]

Goloff et al.

[11] 4,120,622
[45] Oct. 17, 1978

[54] STATIC OIL SEAL ASSEMBLY

[75] Inventors: Alexander Goloff, East Peoria; Charles E. Ballard, Dunlap, both of Ill.

[73] Assignee: Caterpillar Tractor Co., Peoria, Ill.

[21] Appl. No.: 797,222

[22] Filed: May 16, 1977

[51] Int. Cl.² ............................................. F04C 27/00
[52] U.S. Cl. .................................................... 418/142
[58] Field of Search ................ 418/51, 142; 277/81 P; 267/161

[56] References Cited

U.S. PATENT DOCUMENTS 3,905,730   9/1975   Ruf ....................................... 418/142

FOREIGN PATENT DOCUMENTS 1,186,257   4/1970   United Kingdom ..................... 418/142

Primary Examiner—Carlton R. Croyle
Assistant Examiner—Leonard E. Smith
Attorney, Agent, or Firm—Wegner, Stellman, McCord, Wiles & Wood

[57] ABSTRACT

A static oil seal asembly to be carried within a seal receiving groove in a piston or the like and including a pair of separate, metallic, band-like scraper rails, each having one side adapted to engage a housing and the other side disposed within the groove, and a spacer of impervious, flexible material disposed between the scraper rails and abutting the sides of the scraper rails within the grooves in sealing relation therewith, the spacer including a built-in biasing spring for biasing the spacer rails outwardly of the groove.

7 Claims, 5 Drawing Figures

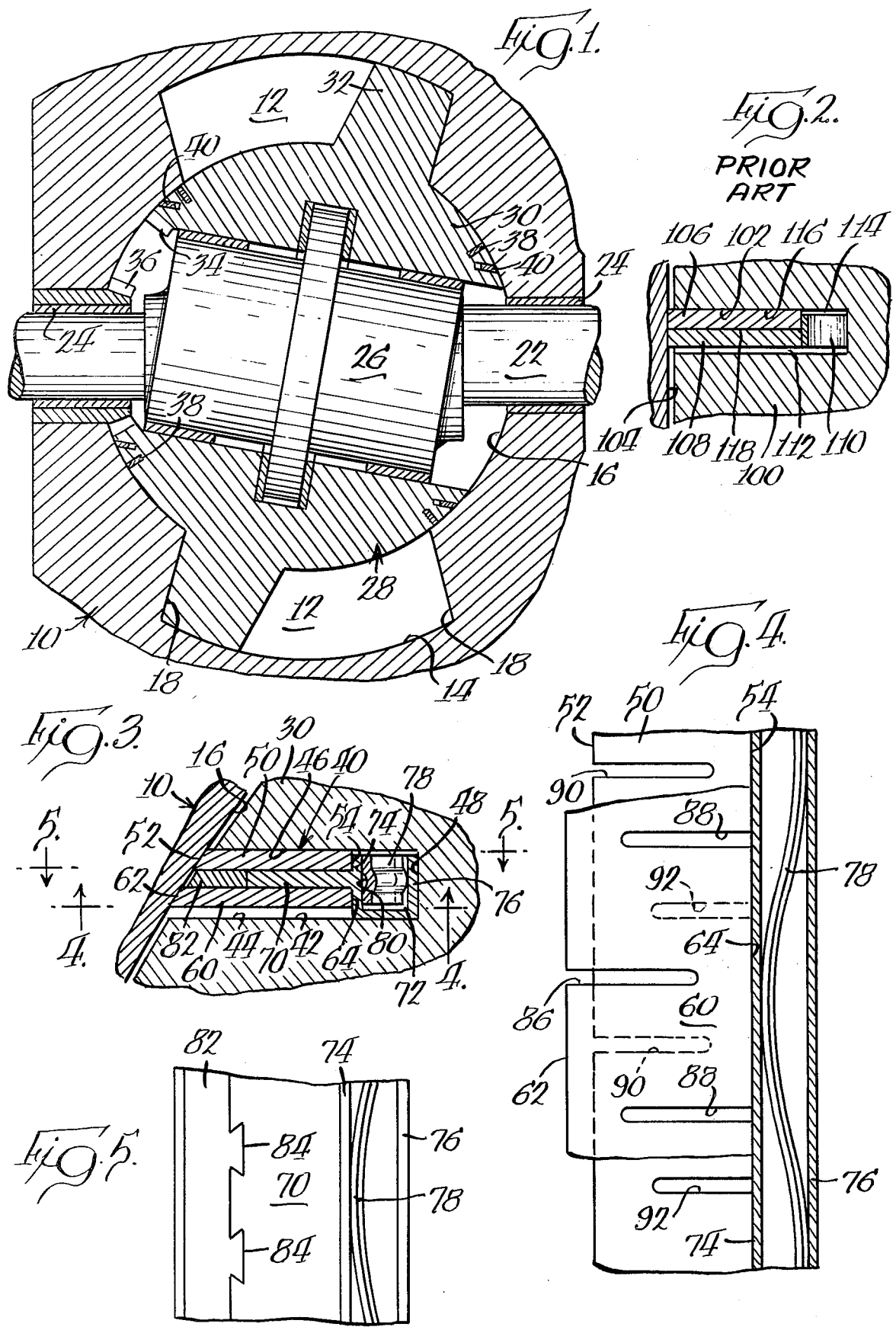

STATIC OIL SEAL ASSEMBLY

BACKGROUND OF THE INVENTION

This invention relates to oil seal assemblies for use in mechanisms such as engines, pumps, compressors, expanders or the like, and, more specifically, to oil seals for use in such mechanisms wherein the oil seal sealingly engages a working chamber wall when the mechanism is quiescent to provide a static seal.

Prior art of possible relevance includes U.S. Pat. No. 3,905,730, issued Sept. 16, 1975 to Ruf.

Double rail oil seals of the type wherein two rails or strips are capable of relative movement with respect to each other have long been employed in mechanisms such as engines, pumps, compressors, expanders, or the like. In many applications, such as the more typical forms of reciprocating diesel or gasoline engines, they have proved to be quite satisfactoy for their intended purpose. However, in other applications, they will not operate satisfactorily for the reason that they do not provide a static seal, that is, establish a seal between a piston and an operating chamber wall when the mechanism is not being operated. In certain types of reciprocating engines, such as radial engines or inverted V-engines and, to a lesser extent, opposed engines, and in virtually all rotary engines such as trochoidal engines or slant axis rotary engines, such double rail seals are generally unsatisfactory.

Those skilled in the art will immediately recognize that each such mechanism has an operating chamber or combustion chamber at or below the level of the main shaft, with the consequence that lubricating oil can drain under the influence of gravity toward the combustion or operating chamber. Because of the absence of a static seal at the oil ring, the oil may seep into the combustion or operating chamber as the case may be and result in difficulty in starting the engine, decreased combustion efficiency, the introduction of a lubricant into a fluid to be pressurized, etc., not to mention the fact that oil consumption would be undesirably increased.

In the above-identified Ruf patent, there is disclosed the use of double bands or hoops, each of which is slotted with the slot staggered in order to prevent oil from running between the crank case and the operating chambers of a rotary mechanism, as would occur if the slots were not staggered. The use of the slots increases the flexibility of the seals to allow them to more nearly perfectly conform to the surface which they sealingly engage to provide an efficient double rail oil seal. However, in such a construction, oil from a crank case can fill the space occupied by the seal biasing spring and seep into the small gap between the seals which exists because it is physically impossible to make the two hoops mate perfectly unless they are lapped. The oil can then enter the slots and exit the same into the combustion area.

Consequently, such a construction, while theoretically quite efficient, tends to be impractical in the marketplace since it may be utilized in mechanisms of the character of concern only if made with extreme precision which is, of necessity, quite costly.

SUMMARY OF THE INVENTION

The present invention is directed to overcoming one or more of the above problems.

According to the present invention, there is provided a mechanism, such as an engine, pump, compressor, expander, or the like having a housing defining an operating chamber. A shaft is journalled within the housing and there is disposed a piston within the housing and movable within the operating chamber and operatively associated with the shaft. An oil seal receiving groove is located on the piston and a double rail oil seal is received in the groove and sealingly engages the housing. The double rail oil seal comprises a pair of separate, metallic, band-like scraper rails, each having one side engaging the housing, and an opposite side within the groove. A spacer of impervious, flexible material is located within the groove and sealingly engages the scraper rails to halt oil leakage. The spacer carries a built-in spring means for biasing the scraper rails out of the groove.

Other objects and advantages will become apparent from the following specification taken in connection with the accompanying drawings.

DESCRIPTION OF THE DRAWINGS

FIG. 1 is a sectional view of a rotary mechanism, specifically, a slant axis rotary mechanism, embodying oil seals made according to the invention;

FIG. 2 is a fragmentary, sectional view of a prior art construction such as that illustrated in the previously identified Ruf patent;

FIG. 3 is an enlarged, fragmentary, sectional view of an oil seal made according to the invention;

FIG. 4 is a fragmentary, sectional view taken approximately along the line 4—4 of FIG. 3; and FIG. 5 is a fragmentary, sectional view taken approximately along the line 5—5 of FIG. 3.

DESCRIPTION OF THE PREFERRED EMBODIMENT

An exemplary embodiment of an oil seal made according to the invention is illustrated in FIGS. 1 and 3-5 in connection with a slant axis rotary mechanism but it is to be understood that it may be used with efficacy in other types of rotary mechanisms and, for example, trochoidal mechanisms. It may also be used in reciprocating mechanisms such as radial engines, inverted V-engines, opposed engines and any other type of engine wherein a static seal between the oil seal and a chamber wall is desired to prevent oil leakage when the mechanisms is inoperative. And, while generally the oil seal of the invention will be employed in such mechanisms when used as engines, those skilled in the art will recognize that many other applications of such mechanisms may use the seal to advantage. For example, the oil seal may be used in pumps, compressors, expanders or the like.

With reference to FIG. 1, the mechanism includes a housing, generally designated 10, having an operating chamber 12. The operating chamber 12 is defined by a radially outer spherical surface 14, a radially inner spherical surface 16, and interconnecting, opposed, generally radially extending side surfaces 18.

A shaft 22 is journalled as by bearings 24 in the housing 10 and extends through the operating chamber 12. Within the chamber 12, the shaft 22 includes an eccentric 26 which journals a rotor, generally designated 28. The rotor 28 includes a spherical hub 30 and a peripheral, multi-apexed flange 32. One side of the hub 30 is provided with timing gear teeth 34 which mesh with a stationary timing gear 36 surrounding one end of the shaft 22.

The flange 32 carries compression seals (not shown) in the form of peripheral seals and apex seals which are arranged in the conventional fashion.

The hub 30 carries compression seals 38 which engage the radially inner spherical surface 16, and radially inwardly of the compression seals 38, the hub 30 also carries oil seals 40. The seals 38 and 40 are received in grooves, as is well known.

Referring to FIG. 3, a groove 42 for receipt of one of the oil seals 40 is illustrated. The groove 42 is formed to be concentric with the eccentric 26 when the rotor 28 is disposed thereon and accordingly has a radially inner cylindrical surface 44 and a radially outer cylindrical surface 46 along with a bottom surface 48. The oil seal 40 is defined by a radially outer metal, band-like hoop 50 defining a scraper rail having a scraping side 52 in sealing engagement with the radially inner spherical surface 16 and an opposed side 54 disposed within the groove 42. Preferably, the outer diameter of the scraper rail 50 is just slightly smaller (0.001–0.002 in.) than the diameter of the radially outer cylindrical surface 46 so that it will not bind in the groove 42. In operation, due to centrifugal force and the radial and circumferential flexibility of the rail 50, it will tightly embrace the surface 46 to effectively seal the interface therewith.

A radially inner metallic band-like hoop defines a scraper rail 60 which includes a scraping side 62, also in sealing engagement with the spherical surface 16. The side 64 of the scraper rail 60 opposite from the side 62 is disposed within the groove 42.

Interposed between the scraper rails 50 and 60, is a spacer 70 formed of a liquid-impervious, flexible material. Preferably, the radially inner scraper rail 60 is formed slightly more oversize than the radially outer scraper rail 50 so that when installed, the spacer 70 will be slightly compressed between the two. By reason of such compression and the flexibility of the spacer 70, a good seal between the two rings is obtained, notwithstanding slight irregularities in their surfaces.

At its point of emergence from the interface of the scraper rails 50 and 60, the spacer 70 includes an integral U-shaped portion 72 having spaced legs 74 and 76. The leg 74 sealingly engages the sides 54 and 64 of the scraper rails 50 and 60, while, as will be seen, the leg 76 sealingly engages the bottom 48 of the groove 42.

Between the legs 74 and 76 of the U-shaped portion 72, there is disposed an undulating leaf spring 78, the undulations of the same being best illustrated in FIG. 4. The leaf spring 78 serves to bias the leg 74 into sealing engagement with the ends 54 and 64 of the scraper rails 50 and 60 and thus to bias the scraper rails 50 and 60 out of the groove 42 and into the aforementioned sealing engagement with the radially inner spherical surface 16. The leaf spring 78 also serves to bias the leg 76 into the previously mentioned sealing engagement with the bottom 48 of the groove 42.

As best seen in FIG. 3, the leaf spring 78 is corrugated in cross section such that its surface abutting the leg 74 includes a depression 80 between opposite sides of the leaf spring 78. Consequently, the bias provided with the spring 78 is applied to those portions of the leg 74 in abutment with the ends 54 and 64 of the scraper rails 50 and 60 and not to that portion of the spacer 70 disposed between the rails 50 and 60. As a result, the scraper rails 50 and 60 are substantially individually loaded with the loading being equalized as opposed to the more conventional spring design wherein one seal may be overloaded at the expense of the other.

The spacer 70 carries a wear strip 82 disposed between the scraper rails 50 and 60 at a location adjacent the ends 52 and 62, but which terminates short of the ends 52 and 62. Preferably, the wear strip is formed of a plastic material that will withstand the temperatures encountered during operation of the mechanism and may be formed of materials such as Teflon, Nylon or Delrin. Teflon is preferred due to its self-lubricating qualities.

As mentioned, the wear strip 82 is carried by the spacer 70 and in view of the possible difficulty of bonding the two components to each other, a series of dovetails 84 interconnect the two.

As seen in FIG. 4, the radially inner scraper rail 60 includes a series of slots 86 (only one of which is shown) which open to the end 62 but not to the end 64 of the scraper rail 60. Staggered between the slots 86 are slots 88 which open to the end 64 but not to the end 62.

The radially outer scraper rail 50 has similar slots 90 which open to the end 52 but not to the end 54 as well as slots 92 staggered between the slots 90 which open to the end 54 but not to the end 52. It will also be observed that the various slots in the two different rails 50 and 60 are staggered with respect to each other and perform as is known in the art.

While the sealing surfaces 52 and 62 of the scraper rails 50 and 60 are illustrated as conforming to the shape of the housing, namely, the radially inner spherical wall 16, those skilled in the art will recognize that they can be stepped, relieved, or made conical so long as the scraping of the oil film occurs at the radially inner edges.

It will be appreciated that an oil seal made according to the invention maintains a static seal even when the mechanism is not in operation. Oil from the crank case which might enter the radially inner portion of the groove 42 cannot flow past the seals for the reason that the spacer 70 prevents it from entering the slots in the spacer rails 50 and 60 and the oil cannot flow around the biasing spring to the interface of the radially outer scraper rail 50 and the radially outer surface 46 of the groove by reason of the sealing contact made by the legs 74 with the ends 54 and 64 of the spacer rails 50 and 60 and the sealing contact made by the leg 76 with the bottom of the groove 48. In this connection, even when the mechanism is not being operated, the bias applied by the spring 78 is sufficient to provide the requisite sealing contact.

It should be observed that the wear strip 82 terminates short of the surface 76 in order to accommodate greater thermal expansion of the wear strip 82 which will normally occur due to the fact that polymers such as those mentioned generally have a considerably higher coefficient of thermal expansion than will the metallic scraper rails 50 and 60. It will also be appreciated that the use of the wear strip 82 prevents smearing of the flexible material of which the spacer 70 is formed to ensure long life of the same. It will also be noted that long life is provided even though there may be a considerable amount of motion of the seal assembly into and out of the groove due to rotor deflection because there is very little relative motion between the radially inner and outer scraper rails 50 and 60 since the leaf spring 78 biases both against the housing surface 16.

It will also be appreciated that by reason of the relative dimensioning of the scraper rails 50 and 60 and the fact that the scraper 70 and wear strip 82 all have integral components or are interconnected to each other and the further fact that the leaf spring 78 is built into the spacer 70, when used in rotary engines, a unitized oil seal assembly results to aid installation and/or replacement since the components thereof are all held in assembled relation due to their resilience and the aforementioned dimensional interrelationships.

The foregoing advantages become all the more apparent when considered in the light of a prior art construction such as that illustrated in FIG. 2 which is generally similar to that disclosed in the previously identified Ruf patent. In Ruf, there is disclosed a trochoidal mechanism having a rotor and opening to the associated side to face a housing end wall 104. Radially inner and outer scraper rails 106 and 108 are disposed concentrically about the eccentric (not shown) and do not fully occupy the width of the groove 102 as illustrated. An undulating biasing spring 110 is disposed within the groove 102 to bias the scraper rails 106 and 108 into sealing engagement with the end wall 104.

The scraper rails 106 and 108 include a slot arrangement (not shown) generally similar to that illustrated in FIG. 4 hereof.

In such a construction, oil from the crank case will not significantly leak through the interface between the end wall 104 and the scraper rails 106 and 108. However, oil may flow from the crank case into the open portion 112 of the groove 102 and into that part 114 of the groove occupied by the leaf spring 110. Due to irregularities in the radially outer surface 116 of the groove 102 and at the interface 118 between the scraper rails 106 and 108, such oil may flow therealong to the operating chamber side of the seal configuration and, where slots are employed, as mentioned previously, to enhance the flexibility of the rails 106 and 108, such oil may travel relatively unimpeded through such slots to cause the aforementioned difficulties.

From the foregoing, it will be appreciated that a seal construction made according to the invention provides a static seal to prevent oil leakage and the attendant problems even when the mechanism is inoperative.

The embodiments of the invention in which an exclusive property or privilege is claimed are defined as follows:

1. In a mechanism such as an engine, pump, compressor, expander or the like having a housing defining an operating chamber, a shaft journalled within the housing, a piston within the housing and movable within the operating chamber and operatively associated with the shaft, an oil seal receiving groove on the piston and a double rail oil seal received in the groove and sealingly engaging the housing, the improvement wherein the double rail oil seal comprises a pair of separate metallic, band-like scraper rails each having one side engaging said housing and an opposite side within said groove and a spacer of impervious, flexible material within said groove sealingly engaging said opposite sides of said scraper rails, said spacer including built-in spring means biasing said spacer into said sealing engagement and said scraper rails out of said groove; said spring means comprising an undulating leaf spring appearing corrugated in cross section with a surface facing said scraper rail opposite sides, a depression between opposite sides of said spring, the portion of said spring including said surface adjacent said depression serving to individually bias an associated one of said scraper rails.

2. In a mechanism such as an engine, pump, compressor, expander, or the like, having a housing defining an operating chamber, a shaft journalled within the housing, a piston within the housing and movable within the operating chamber and operatively associated with the shaft, an oil seal receiving groove on the piston and a double rail oil seal received in the groove and sealingly engaging the housing, the improvement wherein the double rail oil seal comprises a pair of separate metallic, band-like scraper rails each having one side engaging said housing and an opposite side within said groove, and a spacer of impervious flexible material extending between and in sealing engagement with said scraper rails, and including built-in spring means biasing said scraper rails into said sealing engagement with said housing.

3. The mechanism of claim 2 wherein said scraper rails are formed as hoops and are dimensioned to compress said spacer to form a unitized oil seal assembly.

4. The mechanism of claim 2 wherein said spacer, adjacent said scraper rails one side mounts a wear strip.

5. The mechanism of claim 4 wherein said wear strip is secured to said spacer by dovetails.

6. The mechanism of claim 2 wherein said spacer further includes an element sealingly engaging said opposite sides of said scraper rails.

7. The mechanism of claim 6 wherein said spacer includes a portion having a U-shaped cross section and said element is one of the legs thereof; and said spring means is received in said portion between the legs thereof.

* * * * *